(12) United States Patent
Choi et al.

(10) Patent No.: US 9,010,790 B2
(45) Date of Patent: Apr. 21, 2015

(54) BICYCLE FRAMES AND BICYCLES

(71) Applicant: Volagi, LLC, Ogden, UT (US)

(72) Inventors: Robert Choi, Ogden, UT (US); Barley A. Forsman, Cotati, CA (US)

(73) Assignee: Volagi, LLC, Ogden, UT (US)

( * ) Notice: Subject to any disclaimer, the term of this patent is extended or adjusted under 35 U.S.C. 154(b) by 0 days.

(21) Appl. No.: 14/243,806

(22) Filed: Apr. 2, 2014

(65) Prior Publication Data

US 2014/0210181 A1 Jul. 31, 2014

Related U.S. Application Data

(63) Continuation of application No. 13/230,629, filed on Sep. 12, 2011.

(60) Provisional application No. 61/382,283, filed on Sep. 13, 2010.

(51) Int. Cl.
*B62K 3/02* (2006.01)
*B62K 19/00* (2006.01)
*B62K 3/04* (2006.01)
*B62K 19/02* (2006.01)
*B62K 19/16* (2006.01)

(52) U.S. Cl.
CPC . *B62K 19/00* (2013.01); *B62K 3/02* (2013.01); *B62K 3/04* (2013.01); *B62K 19/02* (2013.01); *B62K 19/16* (2013.01)

(58) Field of Classification Search
CPC ........... B62K 3/02; B62K 19/00; B62K 19/02
USPC ........ 280/281.1, 283; 403/204, 203, 225, 291
See application file for complete search history.

(56) References Cited

U.S. PATENT DOCUMENTS

| | | | |
|---|---|---|---|
| 499,707 A | 6/1893 | Bolte | |
| 527,404 A | 10/1894 | Byrne | |
| 973,217 A | 10/1910 | Sager | |
| 1,148,170 A | 7/1915 | Incerti | |
| 1,152,773 A | 9/1915 | White | |
| 2,132,317 A | 10/1938 | Pease | |
| 2,283,671 A | 5/1942 | Finlay et al. | |
| D244,266 S | * 5/1977 | Cognata et al. | ............... D12/111 |

(Continued)

FOREIGN PATENT DOCUMENTS

| | | |
|---|---|---|
| CN | 1115293 | 1/1996 |
| DE | 38 07 369 | 9/1989 |

(Continued)

OTHER PUBLICATIONS

XDS Carbon Tech brochure obtained Sep. 2009.

(Continued)

*Primary Examiner* — Joseph Rocca
*Assistant Examiner* — Daniel Yeagley
(74) *Attorney, Agent, or Firm* — DASCENZO Intellectual Property Law, P.C.

(57) ABSTRACT

Bicycle frames having rear stays that extend past the seat region and connect directly to the top region without being rigidly connected to the seat region. Some bicycle frames according to the present disclosure have a greater vertical compliance than comparably sized standard diamond frames having seat stays that are connected directly and rigidly to a seat tube.

36 Claims, 10 Drawing Sheets

(56) References Cited

U.S. PATENT DOCUMENTS

| | | | |
|---|---|---|---|
| D244,593 S | 6/1977 | Manofsky et al. |
| 4,577,879 A | 3/1986 | Vereyken |
| D284,646 S | 7/1986 | Turner |
| D308,500 S | 6/1990 | Berg et al. |
| D311,508 S | 10/1990 | Rieger et al. |
| 5,188,003 A | 2/1993 | Trammell, Jr. |
| 5,330,219 A | 7/1994 | Groendal et al. |
| 5,335,929 A | 8/1994 | Takagaki et al. |
| 5,632,362 A | 5/1997 | Leitner |
| D411,145 S | 6/1999 | Shankin |
| D420,310 S | 2/2000 | Spriggs et al. |
| 6,123,353 A | 9/2000 | Bennett et al. |
| 6,318,744 B1 | 11/2001 | Lester |
| D503,662 S | 4/2005 | Tiyawatchalapong |
| 6,880,846 B2 | 4/2005 | Schonfeld |
| 6,948,731 B2 | 9/2005 | Noer |
| 7,140,628 B2 | 11/2006 | Parkin |
| D548,141 S | 8/2007 | Pizzi |
| 2002/0125679 A1 | 9/2002 | Jung |
| 2006/0119069 A1 | 6/2006 | D'Alusio et al. |
| 2007/0228689 A1 | 10/2007 | Lin |
| 2009/0102158 A1 | 4/2009 | Antonot |
| 2009/0267317 A1 | 10/2009 | Yang |
| 2010/0007113 A1 | 1/2010 | Earle et al. |
| 2012/0169028 A1 | 7/2012 | Lund et al. |

FOREIGN PATENT DOCUMENTS

| | | | |
|---|---|---|---|
| DE | 89 13 300 | | 12/1989 |
| DE | 93 10 822 | | 1/1994 |
| DE | 43 28 830 | | 5/1995 |
| EP | 0 669 247 | | 8/1995 |
| GB | 0473721 | A * | 10/1937 |
| TW | 356804 | | 4/1999 |
| TW | 453964 | | 9/2001 |
| TW | 470023 | | 12/2001 |
| TW | D134682 | | 5/2010 |

OTHER PUBLICATIONS

Photograph of GT Track Bike downloaded from Internet, Aug. 9, 2010.

Photograph of Izip Urban Cruiser downloaded from Internet Aug. 9, 2010.

Photograph of Maxone Bicycle downloaded from Internet on Aug. 9, 2010.

Photograph of Yamaguchi track bike downloaded from Internet on Aug. 9, 2010.

Photograph of bicycle downloaded from Wikipedia article on bicycle frame, Aug. 9, 2010.

Photograph of Izip Urban Cruiser available at Best Buy, taken Aug. 10, 2010 (1).

Photograph of Izip Urban Cruiser available at Best Buy, taken Aug. 10, 2010 (2).

Photograph of Izip Urban Cruiser available at Best Buy, taken Aug. 10, 2010 (3).

Photograph of Izip Urban Cruiser available at Best Buy, taken Aug. 10, 2010 (4).

English machine translation of the description and claims of German Patent No. DE 89 13 300 downloaded from http://translation portal.epo.org on Apr. 16, 2012.

English machine translation of the description and claims of German Patent No. DE 93 10 822 downloaded from http://translation portal.epo.org on Apr. 16, 2012.

English machine translation of the abstract, description and claims of German Patent No. DE 43 28 830 downloaded from http://translation portal.epo.org on Apr. 16, 2012.

English translation of Taiwan Intellectual Property Office Preliminary Examination Report on related Taiwan Patent Application No. 100133103, dated May 14, 2013.

English language abstract of Chinese Patent No. CN1115293 obtained from the State Intellectual Property Office of the P.R.C. at http://english.sipo.gov.cn/ on Jun. 12, 2013.

English machine translation of Taiwan Patent No. TW453964 obtained from the European Patent Office at www.epo.org on Jun. 12, 2013.

English machine translation of the abstract of German Patent No. DE 38 07 369 obtained from the European Patent Office at www.epo.org on Apr. 4, 2014.

English machine translation of the abstract of Taiwan Patent No. TW356804 obtained from the European Patent Office at www.epo.org on Apr. 11, 2014.

English bibliographic data (no abstract available) for Taiwan Patent No. TW470023 obtained from the European Patent Office at www.epo.org on Apr. 11, 2014.

\* cited by examiner

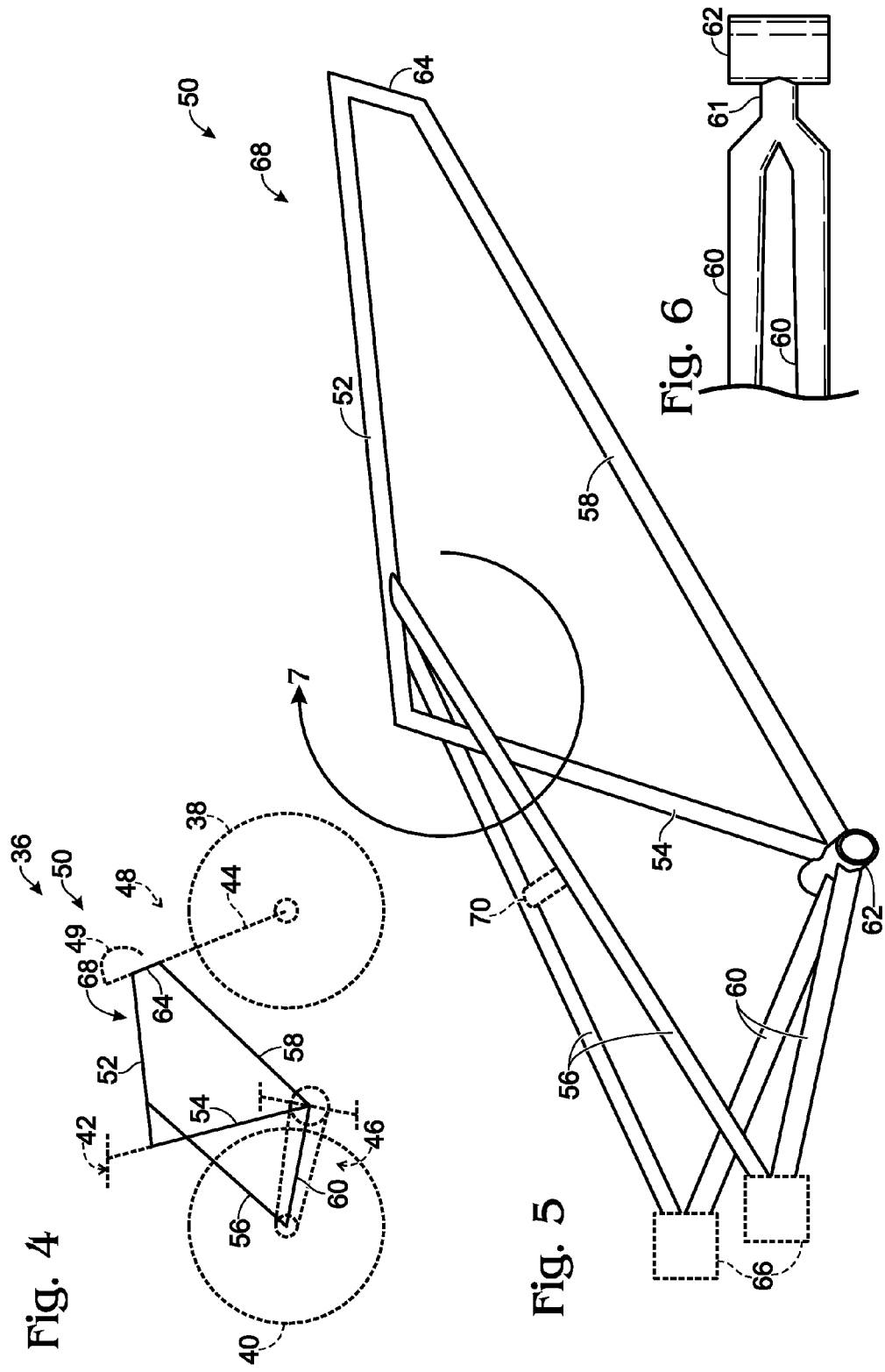

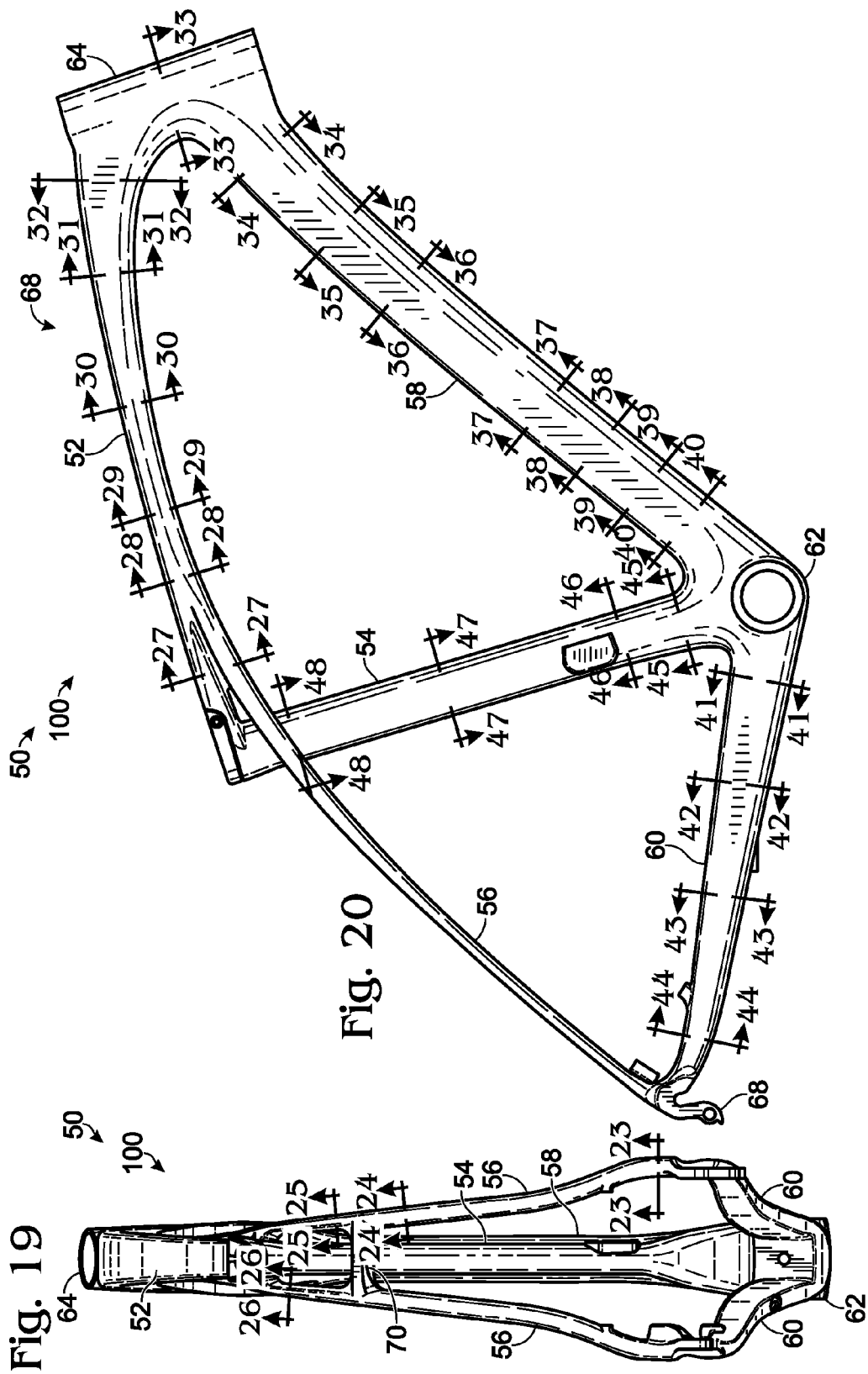

BICYCLE FRAMES AND BICYCLES

RELATED APPLICATIONS

The present application is a continuation of and claims priority under 35 U.S.C. §120 to U.S. Non-Provisional patent application Ser. No. 13/230,629, which is entitled "BICYCLE FRAMES AND BICYCLES," which was filed on Sep. 12, 2011, and which claims priority under 35 U.S.C. §119(e) to U.S. Provisional Patent Application No. 61/382,283, which is entitled "BICYCLE FRAMES AND BICYCLES," which was filed on Sep. 13, 2010. The complete disclosures of these applications are incorporated herein by reference.

FIELD

The present application is directed to velocipedes, and more particularly to bicycles and bicycle frames.

BACKGROUND

Bicycles, or bikes, and other velocipedes come in a variety of shapes and sizes and are designed and used for a variety of purposes. For example, velocipedes may be used for leisure activity, for exercise, for touring, for entertainment, for sport, for business, for cargo hauling, for commuting, for general transportation, etc. Typical bicycles are often classified as one or more of BMX, road, cyclocross, racing, track, touring, utility, commuter, mountain, off-road, downhill, time-trial, triathlon, cruiser, etc.; however, such classifications, or types, of bicycles are certainly not exhaustive and a given bicycle may be used for a variety of purposes regardless of a so-called classification or type for which it is designated or designed to be used.

FIG. 1 illustrates a typical, standard bicycle frame 10, which also may be referred to as a diamond frame due to the side profile of such frames. As indicated in FIG. 1, a standard diamond frame includes a top tube 12, seat tube 14, and a down tube 16. The top tube, seat tube, and down tube are often described as forming a front, or main, triangle 18; however, as seen in at least the illustrated example, these three frame structures may not form a true triangle. For example, a standard diamond frame also typically includes a head tube 20, which in the illustrated example generally forms a quadrilateral together with the top tube, the seat tube, and the down tube. The head tube defines a connection and pivot point (and/or axis of rotation) for a corresponding front fork, to which a bicycle's handlebar and front wheel are coupled. A diamond frame typically also includes a pair of seat stays 22 and a pair of chain stays 24, both terminating at a pair of rear drop-outs 26 at the lower ends thereof. The seat stays typically are coupled directly to the seat tube 14 at the upper ends thereof, as seen in FIG. 1. The seat stays, together with the chain stays and the seat tube form what is often described as a rear triangle 28, again, not necessarily forming a true triangle. The drop-outs are structures that are configured to receive an axle of a corresponding rear wheel of a bicycle to rotationally couple the rear wheel to the frame. A bottom bracket 30 is positioned at the junction of the down tube, the seat tube, and the chain stays, and is where a corresponding crank set of a bicycle is attached. All of the top tube, the seat tube, down tube, seat stays, and chain stays of a typical diamond frame are linear, or at least predominantly linear.

In a traditional diamond frame, such as in the example illustrated, the top tube generally extends at least approximately parallel to the ground surface, when the frame is part of a complete bicycle with front and rear wheels. This frame geometry may be referred to as a traditional geometry. Somewhat recently for road bike frames, a so-called compact geometry has become popular. In a compact geometry bicycle frame, the top tube slopes downward from the head tube to the seat tube, and generally the seat stays connect to the seat tube at approximately the same height as the top tube. Various other non-traditional, or non-standard, frame designs have been used throughout the history of the bicycle.

The aforementioned structural components of bicycle frames are referred to as tubes because historically, these structures were in fact constructed of cylindrical tubes. For example, steel tubing has long been used to construct bicycle frames. More recently aluminum, titanium, and other metal alloys have been used to construct frames, with such materials not necessarily being formed in cylindrical tubes. For example, ovular tubes, or even rectangular tubes are sometimes used. Various other materials also are used to construct frames, such as wood and bamboo.

Somewhat recently, carbon fiber has been used to construct bicycle frames, and in particular high performance road bicycle frames, including frames constructed completely of carbon fiber, as well as composite frames with only portions constructed of carbon fiber. Composite materials that include boron fibers and/or Kevlar fibers also have been used to construct bicycle frames. Such composite materials lend themselves to being formed into a variety of shapes and constructions for bicycle frames. Therefore, frames constructed of such composite materials do not necessarily include linear sections of tubing, and a variety of frame geometries have been employed utilizing composite materials.

Some bicycles may be described as having active suspension systems, such as including pivot points between frame members, shock absorbers, springs, etc. Mountain bikes and downhill bikes are examples of bicycles that may include active suspension systems. When including active suspension systems, such bicycle frames may resemble, or include aspects of, a typical diamond frame with a top tube, a down tube, and a seat tube, while others may not resemble typical diamond frames and may not include one or more of a top tube, a down tube, a seat tube, and seat stays.

Bicycles without active suspension systems may be described as having passive suspension systems, in so far as the various frame members are rigidly (and/or directly or permanently) connected to each other and do not include pivot points, shock absorbers, springs, etc. Performance bicycle frames (e.g., road frames) with passive suspension systems are sometimes described in terms of stiffness to weight (STW) ratios. Various stiffnesses of frames may be measured, including the vertical stiffness, or compliance, of a frame, the lateral (or torsional) stiffness of a frame, as well as the stiffness of individual frame members, such as the bottom bracket of a frame. For performance bicycle frames, manufacturers attempt to optimize these various STW ratios, so that the frame is lightweight, yet highly stiff in certain directions, for example, to ensure that the rider's pedal stroke is efficiently transferring power to the bicycle's wheels and ultimately to the ground.

With reference to FIG. 2, a schematic illustration of a suitable (but not exclusive) test for measuring the lateral (or torsional) stiffness of a frame is provided. As illustrated, the frame is positioned on its side (i.e., with the head tube in a horizontal orientation), and the rear drop-outs are immobilized. A bar, rod, or similar stiff shaft (with an illustrative non-exclusive example being a two-meter steel bar) is positioned through and centered in the head tube, and a predetermined force (such as a one-Newton force) is applied to one end of the shaft. The predetermined force also may be applied by coupling and suspending therefrom a preselected mass 32 to the shaft to thereby apply a known force at a known distance away from the top tube. The deflection 33 of the opposite end of the shaft is measured to provide the lateral stiffness of the frame. This stiffness also may be presented relative to the weight of the frame and may be expressed in terms of a STW ratio.

With reference to FIG. 3, a schematic illustration of a suitable (but not exclusive) test for measuring the vertical stiffness, or compliance, of a frame is provided. The initial set-up for the test may correspond to section 4.8.4.3 of the European Standard for racing bicycle safety (EN 14781 November 2005). More specifically, a frame together with a front fork is positioned in its normal position of use, with the front and rear axles being horizontal with respect to each other, with the rear axle being able to pivot, and with the front fork supported on a flat steel anvil. A mass 34 of 70 kg is positioned on a seat post so that the distance 35 along the seat-post from its center of gravity to the seat post's insertion point in the frame is 75 mm. The deflection of the mass in the vertical direction is measured and may then be expressed in terms of distance per unit force (e.g., mm/kN). With typical diamond frames, the ratio of the vertical displacement of the bottom bracket to the vertical displacement of the mass is close to one. The displacement of the bottom bracket corresponds to the stiffness of the frame, and thus affects the performance, or efficiency, of a performance bicycle. For example, the greater the displacement of the bottom bracket, the more the forces of a rider's pedal stroke are absorbed by the frame as opposed to being transferred to the bicycle's wheels. Conversely, the lesser the displacement of the bottom bracket, the less the forces of a rider's pedal stroke are absorbed by the frame, and the more the forces are efficiently transferred to the bicycle's wheels and ultimately to the ground.

BRIEF DESCRIPTION OF THE DRAWINGS

FIG. 4 is a schematic side view of a bicycle and a bicycle frame according to the present disclosure.

FIG. 5 is a schematic perspective view of illustrative, non-exclusive examples of bicycle frames according to the present disclosure.

FIG. 6 is a schematic illustration of an illustrative, non-exclusive example of a portion of a bicycle frame according to the present disclosure.

FIG. 19 is a rear view of the bicycle frame of FIG. 16.

FIG. 20 is a right side view of the bicycle frame of FIG. 16.

DETAILED DESCRIPTION

Figure 1:
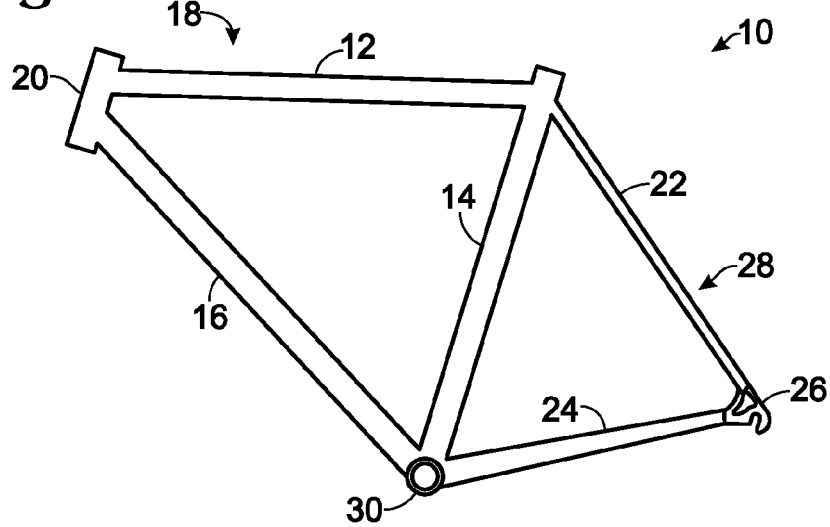
FIG. 1 is a schematic side view of a prior art bicycle frame.
Figure 2:
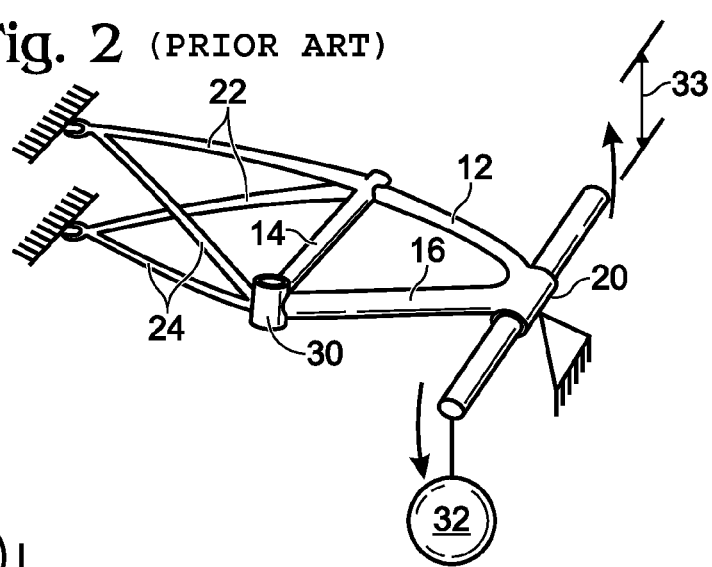
FIG. 2 is a schematic illustration of a test used to measure the lateral, or torsional, stiffness of a bicycle frame.

Bicycle frames according to the present disclosure are schematically illustrated in FIGS. 4-5 and are indicated generally at 50. A portion of frames 50 generally corresponding to the circled portion indicated at 7 in FIG. 5 also is illustrated schematically in FIGS. 7-8. Frames 50 according to the present disclosure include at least a top region 52, a seat region 54, and a pair of rear stays 56. Also within the scope of the present disclosure are bicycles 36 that include a frame 50 according to the present disclosure. Bicycles 36 are schematically illustrated in FIG. 4, and as illustrated may include (but are not required to include) such typical components as a front wheel 38, a rear wheel 40, seat structure 42, a front fork 44, a drive train 46, a brake system 48, and a handlebar or other steering assembly 49. Other bicycle components are also within the scope of bicycles 36 according to the present disclosure.

The structural regions of frames 50 may be referred to as tubes, such as frame sections are generally referred to in the bicycle industry, due to the fact that historically bicycle frames were (and continue to be in some examples) constructed of cylindrical or other tubing. The structural regions of frames 50 also may be referred to as members, as opposed to regions or tubes, because it is within the scope of the present disclosure that one or more of such members are not necessarily hollow. That is, it is within the scope of the present disclosure that various structural members of frames 50 may be hollow or may not be hollow. It is also within the scope of the present disclosure that portions of a respective structural member are hollow while other portions of the respective structural member are not hollow.

It is also within the scope of the present disclosure that the various structural members may not be separate and distinct from other of the various structural members. For example, in a typical prior art diamond frame constructed of steel tubing, each of the top tube, the seat tube, and the down tube are constructed of individual steel tubes that are welded together, and a visual inspection of the completed frame clearly shows where each steel tube starts and stops and where each steel tube is connected to an adjacent steel tube. Bicycle frames 50 according to the present disclosure, on the other hand, are not required to be constructed of individual tubes or members coupled together. For example, frames 50 according to the present disclosure may (but are not required to) be constructed of carbon fiber composite material, or other composite material or materials, and molded as a single unit or multiple individual units that are subsequently coupled together. Accordingly, structural members, as used herein with respect to bicycle frames 50 according to the present disclosure, also may be referred to as, or be described as, structural regions of a bicycle frame. As an illustrative, non-exclusive example, a top member, or region, and a seat member, or region, may be constructed of carbon fiber in a single molding process, in which case the top region refers to the region of the frame generally extending forward of the seat member, or region. As used herein, relative directions and terms, such as forward, rearward, left, right, top, bottom, etc. are used with respect to the typical forward direction of a bicycle having a front wheel and a rear wheel contacting a ground surface and in an upright orientation.

Typically, bicycle frames 50 according to the present disclosure will include a down tube, member, or region, 58, a pair of chain stays 60, a bottom bracket 62, a head tube, member, or region, 64, and a pair of rear drop-outs 66. When present, down region 58 together with top region 52, seat region 54, and head region 64 form a front, or main, triangle 68. As similarly discussed in the background of the present disclosure with respect to standard diamond frames, however, the front triangle may not in fact be a triangle, as is the case in the schematic illustration of FIGS. 4-5, having a head region 64. With reference to FIG. 6, it is within the scope of the present disclosure that the chain stays 60 may not individually extend from bottom bracket 62, and a bottom member, region, or tube 61 may extend rearward directly from the bottom bracket, and the chain stays 60 may extend from the bottom region 61 terminating with the rear drop-outs.

Also illustrated in FIG. 5 is an optional rear brake mounting bracket, or bridge, 70 extending between the rear stays, which may be provided in frames 50 according to the present disclosure that are configured for the mounting of caliper-style rear brakes. Additionally or alternatively, a bridge 70 may be provided, and a specific configuration thereof may be selected, to select, or tune, a desired torsional stiffness of a frame 50 according to the present disclosure. Bridge 70, when present, also may be used to mount an optional rear fender or other accessory.

Various other brake configurations are equally within the scope of the present disclosure, including frames configured for use with disc brakes, and the illustrations of FIGS. 4-6 are simply schematic representations without various optional structures that one of ordinary skill in the art would recognize as being within the scope of bicycle frames. For example, a seat post 72 is schematically illustrated in FIG. 7, but various other optional structure, such as water bottle mounts, drive train mounts, and cable mounts, to name a few, are not schematically illustrated in FIGS. 4-7.

Figure 7:
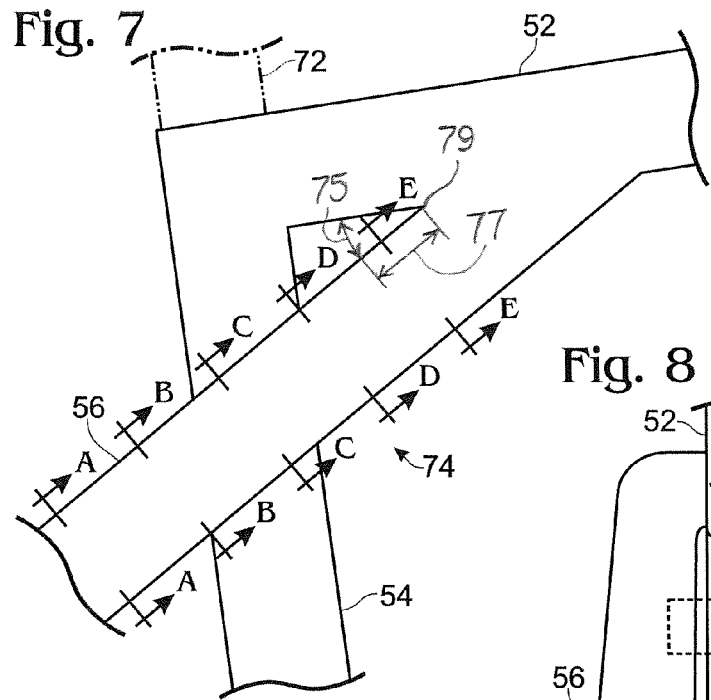
FIG. 7 is a schematic side view of a portion of illustrative, non-exclusive examples of bicycle frames according to the present disclosure, generally corresponding to the section identified at 7 in FIG. 5.
Figure 8:
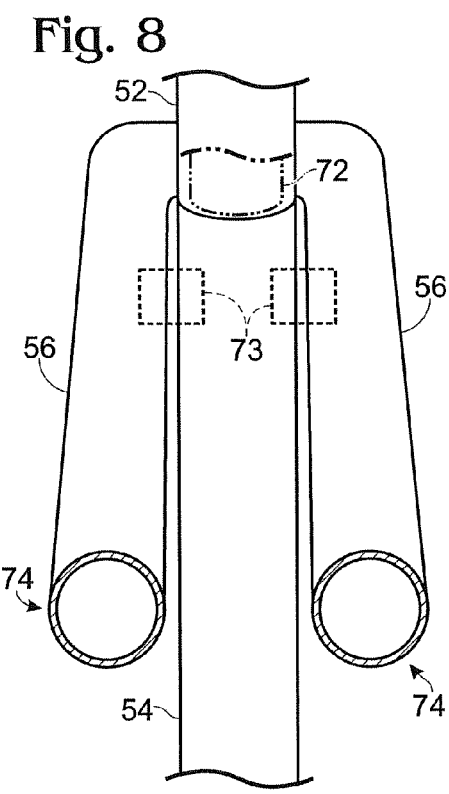
FIG. 8 is a schematic rear view of the portion of illustrative, non-exclusive examples of bicycle frames according to the present disclosure illustrated in FIG. 7.

With reference to FIGS. 5 and 7-8, the rear stays 56 of frames 50 according to the present disclosure may not be fixedly secured to seat region 54, as is the case with a standard diamond frame. Rather, as schematically illustrated, rear stays 56 according to the present disclosure extend past, or bypass, the seat region and are coupled directly to top region 52, forward of the seat region. It is within the scope of the present disclosure (but not required) that the rear stays may engage (i.e., touch) the seat region without being affixed to the seat region. In some embodiments according to the present disclosure, as schematically illustrated in solid lines in FIG. 8, the rear stays do not touch the seat region at all, and thus may be described as being spaced apart from the seat region. However, as illustrated schematically in dashed lines in FIG. 8, it is within the scope of the present disclosure that the rear stays may be affixed to the seat region, such as by one or more connecting members 73. Connecting members 73, when present, may take any suitable form, and in some embodiments may include and/or be formed by an elastomeric material. Additionally or alternatively, the optional connecting members 73, when present, may be constructed of a material that has a greater elasticity than the material from which the rear stays and/or the seat region are constructed. Illustrative, non-exclusive examples of suitable elastomeric materials for construction of optional connecting members 73 include (but are not limited to) rubber, synthetic rubber, polymers, etc. Accordingly, whether the optional connecting members 73 are present or not in a frame 50 according to the present disclosure, when a frame 50 is under load, such as when a bicycle 36 is being ridden, rear stays 56 may bend, bow, and/or otherwise move relative to seat region 54 at least to an extent greater than in a comparable typical diamond frame with rear stays connected directly and rigidly to a seat tube.

Rear stays 56 according to the present disclosure may connect with, or otherwise be coupled to or transition into, top region 52 at any suitable distance away from, or forward of, seat region 54. As illustrative, non-exclusive examples, rear stays 56 may connect to the top region at approximately 2-20%, 2-17%, 2-14%, 2-11%, 2-8%, 2-5%, 5-20%, 5-17%, 5-14%, 5-11%, 5-8%, 8-20%, 8-17%, 8-14%, 8-11%, 11-20%, 11-17%, 11-14%, 14-20%, 14-17%, or 17-20% of the overall length of the top region away from the seat region, based on a longitudinal axis extending from the center of area of seat region 54 at the rear end of the top region to the center of area of head region 64 at the forward end of the top region. Other percentages and ranges of percentages are also within the scope of the present disclosure, including values and ranges that are less than, greater than, and within the values and ranges enumerated herein. When referring to lengths of members, or regions, herein, such lengths may be defined by the longitudinal, or central, axis of the respective region as measured from where the axis intersects adjacent regions. Additionally or alternatively, such lengths may be defined along an outer surface of a respective region from a point of noticeable transition or intersection with an adjacent region of one end to a point of noticeable transition or intersection with an adjacent region of an opposite end. Additionally or alternatively, such lengths may correspond to a side profile view of frames 50.

Rear stays 56 according to the present disclosure may connect with, or otherwise be coupled to or transition into, top region 52 at any suitable angle relative to the top member. As illustrative, non-exclusive examples, rear stays 56 may connect to the top region at approximately 1-45°, 1-40°, 1-35°, 1-30°, 1-25°, 1-20°, 1-15°, 1-10°, 1-5°, 5-40°, 5-35°, 5-30°, 5-25°, 5-20°, 5-15°, or 5-10° relative to a longitudinal axis of the top member. Other angles and ranges of angles also are within the scope of the present disclosure, including angles and ranges that are less than, greater than, and/or within the values and ranges enumerated herein. It is also within the scope of the present disclosure that the rear stays may connect to the top region in an asymptotic, or at least generally asymptotic, manner, such that an angle of connection between the rear stays and the top region cannot be determined and/or does not in fact exist. Accordingly, the above enumerated suitable ranges of angles between the rear stays and the top region in some embodiments may correspond to an angle 75 between the top region and the rear stays at a distance 77 away from an apex 79 between the top region and the rear stays. For example, the above enumerated ranges of angles may correspond to a distance away from the apex in the range of 5-80, 5-55, 5-30, 30-80, 30-55, or 55-80 mm. Additionally or alternatively, such a distance away from an apex between the top region and the rear stays may be described in terms of a percentage of an overall length of the rear stays, including (but not limited to) distances in the range of 2-20%, 2-17%, 2-14%, 2-11%, 2-8%, or 2-5% of the overall length of the rear stays away from the apex. Other distances and percentages outside of the enumerated ranges also are within the scope of the present disclosure. FIG. 7 schematically illustrates a distance 77 away from the apex 79 at which an angle 75 may be measured.

Rear stays 56 according to the present disclosure may be generally linear along their entire length (e.g., when viewed from the side), or they may be only predominantly linear across their length. It is also within the scope of the present disclosure that the rear stays of a frame 50 according to the present disclosure are curved, predominantly curved, and/or partially curved along their lengths (e.g., when viewed from the side). In some frames according to the present disclosure, the rear stays may be described as including at least one curved region, with this curved region in some embodiments permitting greater vertical flexing than a corresponding linear stay without at least one curved region. When the stays include a curved region, or are curved along the entire length thereof, the curve may be concave, convex, or concavo-convex (i.e., include concave and convex portions), with concave referring to concave in a forward and downward direction and with convex referring to convex in a rearward and upward direction. It also is within the scope of the present disclosure that the stays may include regions of different (or no) curvature. In some embodiments that include curved rear stays, a predominant portion of the rear stays may have a constant or approximately or nearly constant radius of curvature, for example corresponding to an arc of a circle. The various curved rear stays, or curved rear stay portions, described and/or illustrated herein additionally or alternatively may be referred to as being non-linear and/or arcuate within the scope of the present disclosure.

Additionally or alternatively, some embodiments of frames 50 according to the present disclosure may include rear stays with varying radii of curvature along their lengths, as viewed from the side of the frame. As illustrative, non-exclusive examples, suitable radii of curvature include radii of curvature in the range of 500-1200 mm, including 600-1100 mm, 670-950 mm, etc. In some embodiments, the radii of curvature may be more that 600 mm for a substantial portion of the rear stays, and as illustrative, non-exclusive examples, such a substantial portion may be in the range of 40-100%, 40-80%, 40-60%, 60-100%, 60-80%, or 80-100% of the overall length of the rear stays. Other lengths, including lengths less that 40% of the overall length of the rear stays also are within the scope of the present disclosure for having radii of curvatures greater than 600 mm, as well as for having radii of curvatures less than or equal to 600 mm.

The aforementioned radii of curvature may be appropriate for various suitable sizes of frames, as typically identified in the bicycle industry. For example, road bicycle frames having a compact geometry are often sized as extra small, small, medium, large, and extra-large. Additionally or alternatively, frames having a traditional frame geometry, as well as frames having a compact frame geometry, may be sized generally corresponding to a length from the center of the bottom bracket to the center of the top tube (or member or region) along the seat tube (or member or region), and/or to the center of an imaginary top tube (or member or region), if the top tube (or member or region) were horizontal. For example, typical frames sizes may be in the 50-60 cm range, including sizes of 50, 51, 52, 53, 54, 55, 56, 57, 58, 59, and 60 cm. Frames 50 according to the present disclosure may be sized according to any of the aforementioned frame sizes, as well as other frame sizes and ranges of sizes that are less than, greater than, and within the values and ranges enumerated herein. Furthermore, the aforementioned radii of curvature with respect to the rear stays 56 of frames 50 according to the present disclosure may be suitable for any of the enumerated or other frame sizes discussed herein, and/or may be appropriately increased or decreased to be shaped and sized to a specific frame geometry and/or size.

Figure 9:
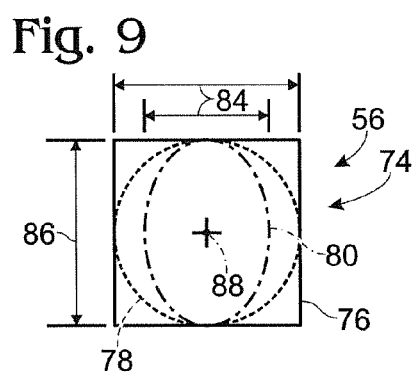
FIG. 9 is a schematic illustration of cross-sectional profiles of illustrative, non-exclusive examples of rear stays of bicycle frames according to the present disclosure.
Figure 10:
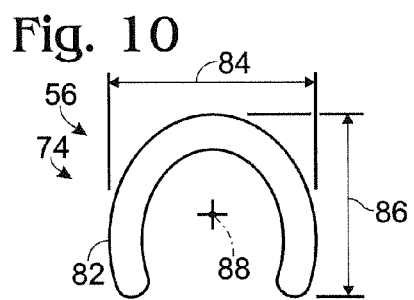
FIG. 10 is a schematic illustration of cross-sectional profiles of illustrative, non-exclusive examples of rear stays of bicycle frames according to the present disclosure.

In FIG. 8, perpendicular cross-sectional profiles 74 of rear stays 56 are schematically illustrated as circular; however, rear stays according to the present disclosure may have any suitable cross-sectional profiles, including (but not limited to) cross-sectional profiles that are hollow, that are not hollow, that are symmetrical, that are not symmetrical, that are elliptical, that are ovoid, that include a concave cross-sectional dimension, that include no corner regions, that include at least one corner (or edge) region, that are regular, and/or that are not regular. With reference to FIG. 7, various perpendicular cross-sectional profiles 74 are schematically indicated at lines A-A, B-B, C-C, D-D, and E-E. Referring to FIGS. 9-10, various illustrative, non-exclusive examples of profiles 74 of rear stays 56 according to the present disclosure are schematically illustrated. For example, as indicated at 76, 78, and 80 in FIG. 9, a cross-sectional profile of a rear stay may be rectangular, circular, or ovular, respectively, and as indicated at 82 in FIG. 10, a perpendicular cross-sectional profile of a rear stay may be somewhat irregular or symmetrical with respect to only a single axis. Other configurations of rear stays are also within the scope of the present disclosure, and the rear stays according to the present disclosure are not limited to the various optional profiles that are schematically, or otherwise, illustrated herein. A "perpendicular cross-sectional profile," as used herein, refers to a cross-sectional profile that is within a plane that is perpendicular to the longitudinal axis of the respective component, such as of a rear stay 56.

As indicated in FIGS. 9-10, perpendicular cross-sectional profiles 74 of rear stays 56 may be described in terms of a width 84 and a height 86 at any given position along the lengths of the rear stays. Such a width refers to a dimension of the profile generally corresponding between a left-most side of the profile to the right-most side of the profile, and such a height refers to a greatest dimension of the profile that is perpendicular to the width; however, because a given perpendicular cross-sectional profile may not be (and likely is not) vertically aligned with respect to the overall frame and corresponding bicycle, such a height does not necessarily correspond to a vertical direction. Profiles 74 also may be described with respect to a center of area, or mass, 88.

It is within the scope of the present disclosure that perpendicular cross-sectional profiles 74 may change over the length of a rear stay 56. That is, a rear stay 56 may have a plurality of perpendicular cross-sectional profiles 74, with such plurality of profiles having one or more shapes, heights, widths, thicknesses, cross-sectional areas, dimensions, centers of area, symmetries, etc. For example, as a non-limiting example with reference to FIG. 7, a first profile corresponding to line A-A may have a shape with a first width, while a second profile corresponding to line E-E may have a shape with a second width that is less than (or greater than) the first width of profile A-A. Other configurations are equally within the scope of the present disclosure.

Turning now to FIGS. 11-14, schematic representations of illustrative, non-exclusive examples of perpendicular cross-sectional profiles 74 that vary over a length of a rear stay are provided. With reference to FIG. 7, the schematically illustrated profiles of FIGS. 11-14 may (but are not required to) correspond approximately to the perpendicular cross-sectional profiles indicated at lines A-A through E-E. That is, FIGS. 11-14 may be interpreted such that the profile A-A is further away from the top region of a frame than the profile E-E (i.e., closer to the rear drop-outs); however, it is also within the scope of the present disclosure that the schematically illustrated profiles of FIGS. 11-14 represent transitions in the opposite direction relative to the top region of a frame.

Figure 11:
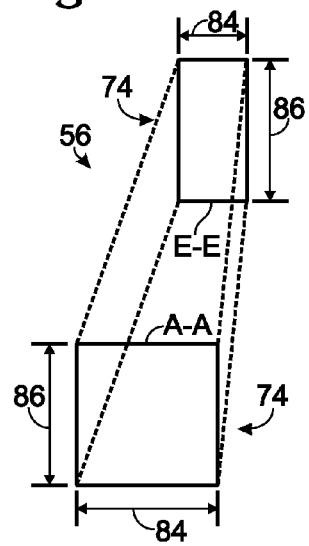
FIG. 11 is a diagram schematically illustrating illustrative, non-exclusive examples of rear stays of bicycle frames according to the present disclosure.
Figure 12:
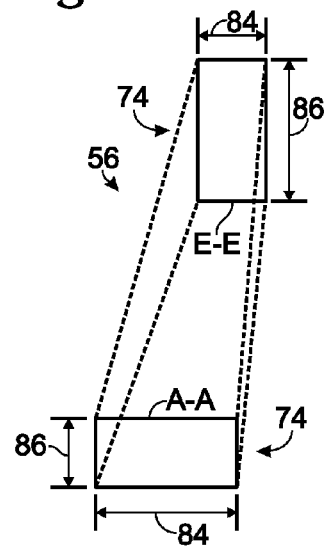
FIG. 12 is a diagram schematically illustrating illustrative, non-exclusive examples of rear stays of bicycle frames according to the present disclosure.
Figure 13:
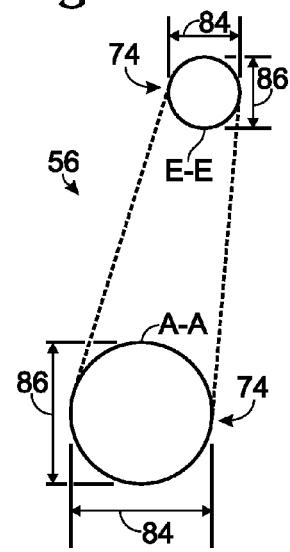
FIG. 13 is a diagram schematically illustrating illustrative, non-exclusive examples of rear stays of bicycle frames according to the present disclosure.

FIG. 11 schematically illustrates an example in which a profile A-A transitions to a profile E-E, with the height 86 remaining the same, but with the width 84 decreasing. FIG. 12 schematically illustrates an example in which a profile A-A transitions to a profile E-E, with the height 86 increasing, and the width 84 decreasing. FIG. 13 schematically illustrates an example in which a profile A-A transitions to a profile E-E, with both the height 86 and the width 84 decreasing. Each of FIGS. 11-13 schematically illustrate the transition in dimensions from a profile A-A to a profile E-E to be generally linear in nature; however, such a configuration is not required to all embodiments of frames 50 according to the present disclosure, and it is within the scope of the present disclosure that such a transition may be non-linear according to any suitable configuration.

Figure 14:
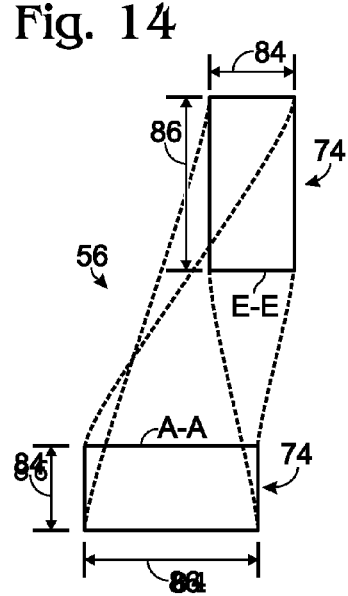
FIG. 14 is a diagram schematically illustrating illustrative, non-exclusive examples of rear stays of bicycle frames according to the present disclosure.

FIG. 14 schematically illustrates yet another example of a rear stay in which a profile A-A transitions to a profile E-E, with the height 86 increasing and the width 84 decreasing, but with the transition between the two being schematically represented in a non-linear fashion. As an illustrative, non-exclusive example, such a configuration may be described as having a rear stay profile that rotates, or twists, along its length. Other configurations are also within the scope of the present disclosure.

FIGS. 11-14 schematically represent that the perpendicular cross-sectional profiles of the rear stays may change over the length of the rear stays. That said, it is within the scope of the present disclosure, that portions, regions, or sections of the rear stays may include a length, and in some embodiments a substantial length, with perpendicular cross-sectional profiles that do not change, or that are constant or generally constant, over such a length or substantial length. For example, it is within the scope of the present disclosure that rear stays may include generally constant perpendicular cross-sectional profiles for lengths in the range 20-100%, 20-80%, 20-60%, 20-40%, 40-100%, 40-80%, 40-60%, 60-100%, 60-80%, or 80-100% of the overall length of the rear stays. Lengths less than 20% of the overall length of the rear stays also are within the scope of the present disclosure.

Additionally or alternatively, it is within the scope of the present disclosure that one or both of the width and height of the perpendicular cross-sectional profiles of the rear stays remain constant or generally constant over a length, and in some embodiments over a substantial length, of the overall length of the rear stays. As illustrative, non-exclusive examples, such lengths of constant or generally constant widths and/or heights may be in the range of 20-100%, 20-80%, 20-60%, 20-40%, 40-100%, 40-80%, 40-60%, 60-100%, 60-80%, or 80-100% of the overall length of the rear stays. Lengths less than 20% of the overall length of the rear stays also are within the scope of the present disclosure.

Examples of perpendicular cross-sectional profiles 74 in which the width 84 of the profile decreases as it extends by the seat region and toward the top region may be advantageous in some configurations of frames 50, for example, to ensure that the rear stays do not interfere with the legs of a rider of a bicycle having a frame 50. Additionally or alternatively, by having a profile width 84 that decreases and/or a height 86 that increases as the rear stay extends by the seat member and toward the top member may result in a rear stay that is vertically stiffer toward the top region and vertically less stiff away from the top region and toward the rear drop-outs 66. Accordingly, a rear stay profile transition may be selected to optimize, or otherwise select a desired, ride comfort (or vertical compliance) of a frame 50, while also optimizing, or otherwise selecting a desired, lateral stiffness of a frame 50.

Various configurations of perpendicular cross-sectional profiles 74 and profile transitions may be selected for use in an embodiment of a frame 50 to optimize, tune, or otherwise select a ride comfort value, and the present disclosure is not limited to configurations in which the width of a rear stay decreases as it approaches the top member. The perpendicular cross-sectional profiles of the rear stays may directly correlate with, or otherwise contribute to, the stiffness of the frame, and by having the rear stays extend forward of the seat region and not be connected directly to the seat region, a more vertically compliant frame is provided, without necessarily resulting in a decrease in lateral stiffness of the frame.

Accordingly, a frame 50 according to the present disclosure when compared to a traditional diamond frame of similar geometry (e.g., size, weight, etc.) may result in a more comfortable ride (less vertical stiffness, or more vertical compliance) but with an approximately equal lateral stiffness, resulting in a more comfortable, but high performance, bicycle frame. Optimizing the transition of the rear stay profiles as they transition along their length further enables optimization, tuning, and/or selecting of a desired ride comfort and performance.

Figure 15:
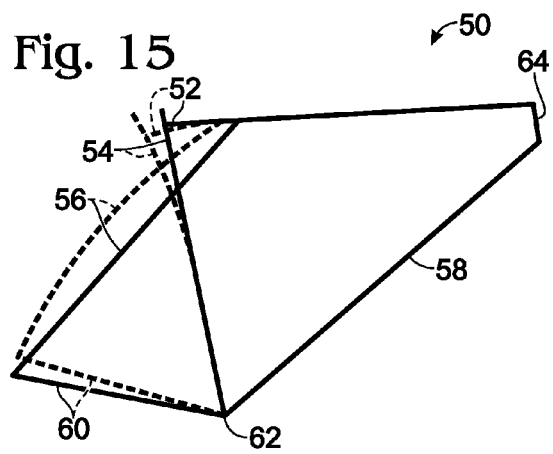
FIG. 15 is a schematic side view of a bicycle frame according to the present disclosure, illustrating deformation of the frame under a load.
Figure 16:
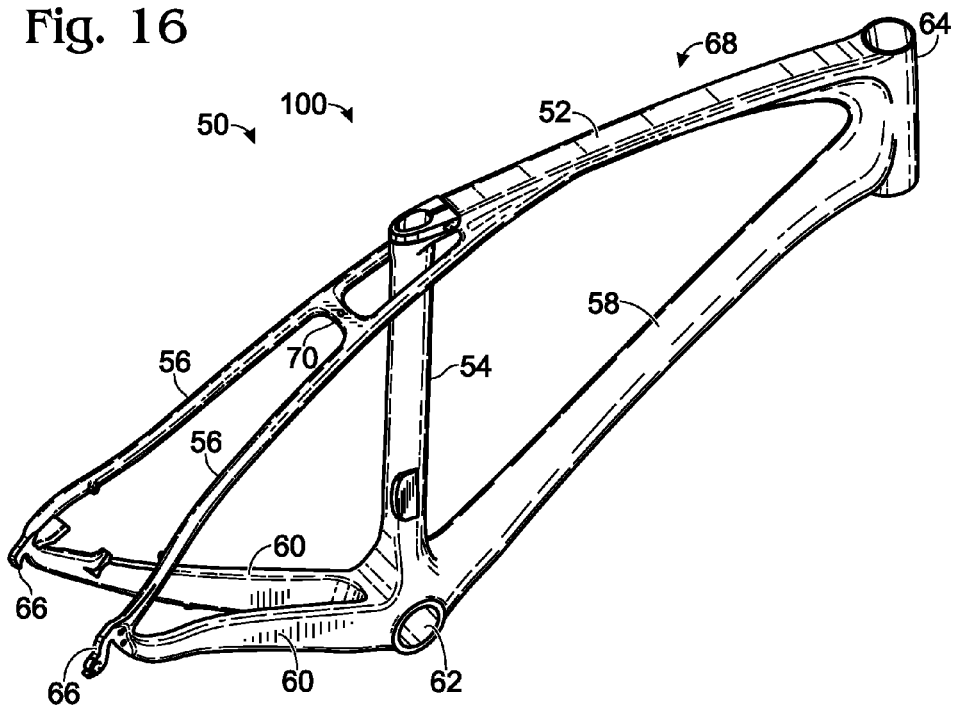
FIG. 16 is a top rear perspective view of an illustrative, non-exclusive example of a bicycle frame according to the present disclosure, illustrated together with an associated fork.

FIG. 15 schematically illustrates a frame 50 according to the present disclosure with rear stays 56 that bypass seat region 54 and that are coupled directly to top region 52, with the frame schematically illustrated in solid lines in a neutral, unloaded condition and in dashed lines in a vertically loaded condition. While not drawn to scale, it can be seen that when the frame is under a vertical load (such as when a rider is seated on a bicycle), the rear stays bow, or bend, rearward and upward relative to their neutral position, the upper portion of seat region 54 bows, or bends, rearward from its neutral position, and the chain stays 60 pivot upward from the bottom bracket 62 relative to their neutral positions and with very minimal vertical movement, if any at all, of the bottom bracket. As a result, a rider of a bicycle including a frame 50 experiences a comfortable vertical compliance of the frame, while at the same time the rider's pedal strokes may be efficiently transferred to the drive chain. In other words, the forces applied to the pedals by a rider almost exclusively are used to rotate the drive train, and do not serve to deform the frame in an inefficient manner. This result is evident from the minimal vertical movement of the bottom bracket, even when the frame is experiencing significant forces applied by the weight of a rider, as well as by the pedal strokes of the rider.

Figure 3:
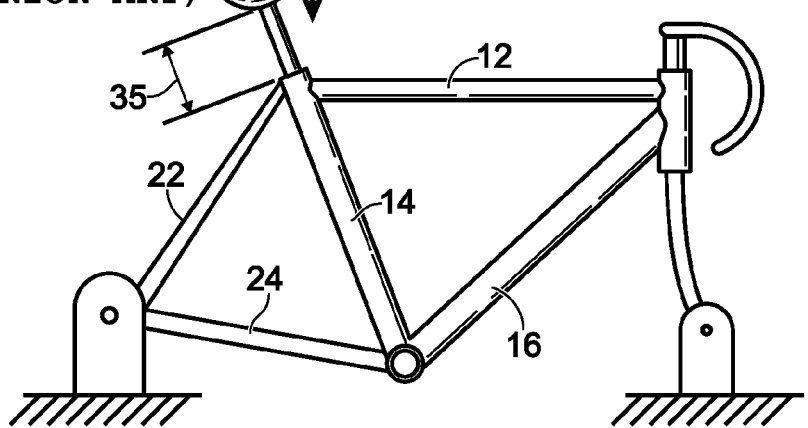
FIG. 3 is a schematic illustration of a test used to measure the vertical compliance, or stiffness, of a bicycle frame.

As illustrative, non-exclusive examples, a frame 50 according to the present disclosure may have a vertical stiffness that is approximately 1-50%, 1-30%, 1-20%, 1-10%, 1-5%, 5-50%, 5-30%, 5-20%, 5-10%, 10-20%, 10-30%, 0.1-1%, 0.1-2%, 1-2%, 1-5%, 1%, 2%, 3%, 5%, 10%, 20%, 25%, or 30% of the vertical stiffness of a corresponding and comparable frame having the rear stays (or seat stays) that are connected directly and rigidly to the seat tube, member, or region. By this it is meant that the frame 50, such as due to the configuration and construction of the frame, including the frame's rear stays 56, may enable a greater degree of vertical movement, or vertical compliance, in response to a predetermined loading, or applied force, than a corresponding conventional, or standard diamond, frame having rear stays (or seat stays) that are connected directly to the seat tube, member, or region, while at the same time having equal or even greater lateral stiffness than the corresponding conventional frame. Additionally or alternatively, a frame 50 may have a vertical compliance that is approximately 1.1-2 times greater than the vertical compliance of a comparably sized frame with a standard diamond configuration having seat stays that connect directly and rigidly to a seat tube. Other ranges and values of vertical stiffness and vertical compliance also are within the scope of the present disclosure, including values and ranges that are less than, greater than, and within the values and ranges enumerated herein. Although not required to all embodiments, a frame 50 according to the present disclosure may (but is not required in all embodiments to) have a vertical stiffness, or vertical compliance, that permits vertical movement of 2-10 mm/1 kN, including such illustrative vertical stiffnesses (or compliances) of at least 2-8, 2-6, 2-4, 4-10, 4-8, 4-6, 6-10, 6-8, 8-10, 2, 3, 4, 5, 5.5, 5.6, 5.7, 5.8, 6.0, at least 5, at least 6, and at least 7, and greater than 10 mm/1 kN, utilizing a typical test for measuring vertical stiffness (e.g., as described in the background of the present disclosure with reference to FIG. 3), which additionally or alternatively may be referred to as a test for measuring the vertical compliance and/or the vertical movement per unit of applied force. It is within the scope of the present disclosure that frames 50 may have a vertical compliance, or movement, that is greater or less than the above-presented illustrative, non-exclusive examples.

Aspects and characteristics of various configurations of rear stay profiles and profile transitions also may be selected for aesthetic purposes, and not solely based on the functional correlation to the stiffness (whether vertical or lateral) or aerodynamics of the frame, and thus the performance, of a bicycle frame 50. Similarly, aspects and characteristics of various configurations of other members, or regions, of frames 50, including respective profiles and profile transitions thereof, may be selected for aesthetic purposes, and not solely based on the functional correlation to the stiffness or aerodynamics, and thus the performance, of a bicycle frame 50.

Frames 50 according to the present disclosure may be constructed of any suitable material, utilizing any suitable process. Illustrative, non-exclusive examples of suitable materials include (but are not limited to) steel, aluminum, titanium, wood, bamboo, carbon fiber composite, and other composite materials. Some frames 50 according to the present disclosure may be constructed of a combination of materials. For example, as an illustrative, non-exclusive example, a frame 50 according to the present disclosure may be constructed with a top region, a head region, a down region, a seat region, and chain stays all constructed of aluminum (or other metal or alloy such as steel or titanium), but with the rear stays constructed of a carbon fiber composite, or at least primarily constructed of carbon fiber composite. Additionally or alternatively, a frame 50 according to the present disclosure may be constructed with a top region, a head region, a down region, and a seat region all constructed of aluminum (or other metal or alloy such as steel or titanium), but with the rear stays and the chain stays constructed of carbon fiber composite, or at least primarily constructed of a carbon fiber composite. Other composite frames and combinations of materials are also within the scope of the present disclosure. As used herein a carbon fiber composite material should be understood to include at least an epoxy or other polymer or binding material together with carbon fibers. Other fibers (e.g., boron, Kevlar) other than carbon fibers are also within the scope of the carbon fiber composites, as used herein.

Frames 50 according to the present disclosure may be constructed utilizing a traditional frame geometry, utilizing a compact frame geometry, or utilizing any other suitable configuration of frame geometry.

Frames 50 may be constructed generally to be categorized as one or more of (but not limited to) BMX, road, cyclocross, racing, track, touring, utility, commuter, mountain, off-road, downhill, time-trial, triathlon, cruiser, performance, etc. Frames 50 may be particularly well suited for performance road bicycles.

Turning now to FIGS. 16-49, an illustrative, non-exclusive example of a frame 50 according to the present disclosure is illustrated and indicated generally at 100. Where appropriate, the reference numerals from the schematic illustrations of FIGS. 4-15 are used to designate corresponding parts, members, or regions of frames 50 according to the present disclosure; however, the example of FIGS. 16-49 is non-exclusive and does not limit the present disclosure to the illustrated embodiment. That is, neither frames nor various portions thereof are limited to the specific embodiment disclosed and illustrated in FIGS. 16-49, and frames 50 according to the present disclosure may incorporate any number of the various aspects, configurations, characteristics, properties, etc. illustrated in the embodiment of FIGS. 16-49, in the schematic representations of FIGS. 4-15, as well as variations thereof, without requiring the inclusion of all such aspects, configurations, characteristics, properties, etc. For the purpose of brevity, each previously discussed component, part, portion, region, aspect etc. or variants thereof, may not be discussed again with respect to FIGS. 16-49; however, it is within the scope of the present disclosure that the previously discussed features, materials, variants, etc. may be utilized with the illustrated embodiments of FIGS. 16-49.

Frame 100 is an example of a frame 50 that may be particularly well suited for construction from a carbon fiber composite material; however, other materials also may be used to construct frame 100.

Figure 23:
FIG. 23 is a cross-sectional profile view of the bicycle frame of FIG. 16, taken along line 23-23 in FIG. 19.
Figure 24:
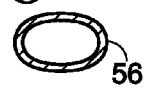
FIG. 24 is a perpendicular cross-sectional profile view of the bicycle frame of FIG. 16, taken along line 24-24 in FIG. 19.

As seen with reference to FIGS. 23-26, which illustrate perpendicular cross-sectional profiles of the rear stays of frame 100, as indicated in FIG. 19, frame 100 is an example of a frame 50 having rear stays 56 with perpendicular cross-sectional profiles that vary along their length. Specifically, the rear stays of frame 100 include perpendicular cross-sectional profiles whose widths 84 decrease toward the top region of the frame relative to the rear drop-outs, and whose heights 86 increase toward the top region of the frame relative to the rear drop-outs. Stated differently, the cross-sectional width of the rear stays of frame 100 decreases as the rear stays transition from the rear drop-outs 66 toward the top region 52, and in particular, where the rear stays bypass the seat region 54. Additionally, the cross-sectional height of the rear stays of frame 100 increases as the rear stays transition from the rear drop-outs toward the top region. That said, as seen with reference to FIGS. 23 and 24, illustrating two identical perpendicular cross-sectional profiles of the rear stays at different points along the rear stays, the perpendicular cross-sectional profiles do not change for a substantial portion of their lengths, for example, between adjacent the rear drop-outs 66 and adjacent the rear drop-out side of the optional rear brake mounting bridge 70. This substantial portion, or length, of the rear stays of frame 100 is in the range 40-80%, and specifically is approximately 60%, of the overall length of the rear stays; however, as discussed herein, other lengths and substantial lengths of constant, or generally constant, perpendicular cross-sectional profiles also are within the scope of the present disclosure.

From the rear drop-out side of the optional rear brake mounting bridge to where the rear stays bypass the seat region, the perpendicular cross-sectional profiles of the rear stays of frame 100 generally correspond to the schematic illustration of FIG. 12. Accordingly, frame 100 provides the benefits of the bypassing rear stays, but without an excessive width of the frame in the region where the rear stays bypass the seat region when compared to a standard diamond frame. Therefore, the legs of a rider of a bicycle including frame 100 will not engage the rear stays during normal pedal strokes of a typical bicycle rider. On the other hand, a frame 50 in which the widths of the rear stays do not decrease in the region of where the rear stays bypass the seat region may not prevent a rider's legs from engaging the seat stays, although such a configuration is expressly within the scope of the present disclosure.

Figure 25:
FIG. 25 is a perpendicular cross-sectional profile view of the bicycle frame of FIG. 16, taken along line 25-25 in FIG. 19.
Figure 26:
FIG. 26 is a perpendicular cross-sectional profile view of the bicycle frame of FIG. 16, taken along line 26-26 in FIG. 19.

The perpendicular cross-sectional profiles of the rear stays illustrated in FIGS. 23-24 and 26 may be described as generally ovular or elliptical, whereas the perpendicular cross-sectional profile of the rear stays illustrated in FIG. 25 may be described as being generally circular or having a generally rounded square shape. Additionally or alternatively, the perpendicular cross-sectional profiles of FIGS. 23-26 may be described as having generally squashed circular shapes, with at least one central axis of symmetry.

Figure 17:
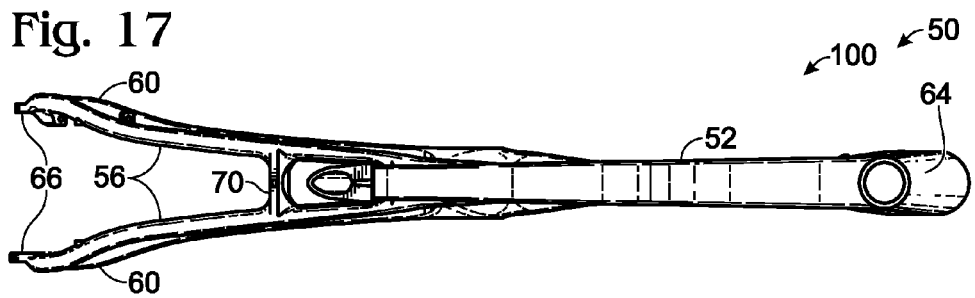
FIG. 17 is a top view of the bicycle frame of FIG. 16.
Figure 18:
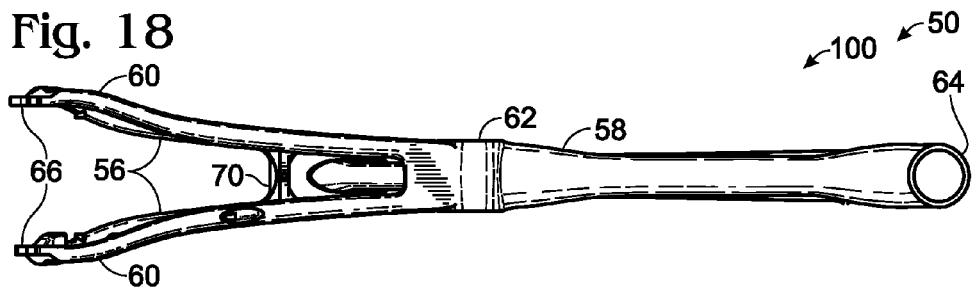
FIG. 18 is a bottom view of the bicycle frame of FIG. 16.
Figures 21, 22:
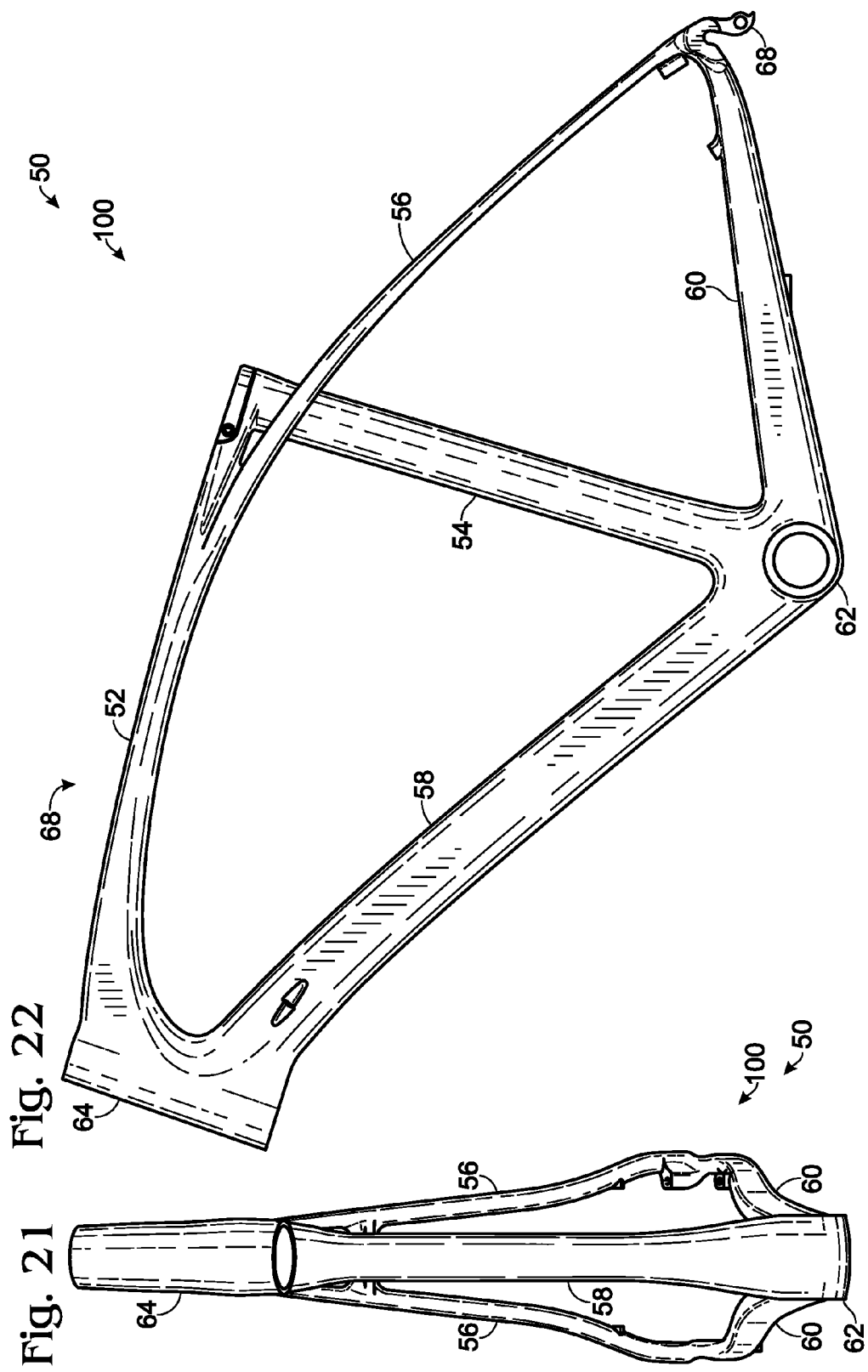
FIG. 21 is a front view of the bicycle frame of FIG. 16.
FIG. 22 is a left side view of the bicycle frame of FIG. 16.

Also, as perhaps best seen in FIGS. 17 and 19, frame 100 is an example of a frame 50 in which the rear stays do not engage, or otherwise contact, seat region 54 at all.

In the illustrative, non-exclusive example of frame 100, the rear stays connect to, or transition into, the top region at approximately 8.8% of the length of the top region forward of the seat region, and at an angle of approximately 7°.

Figure 27:
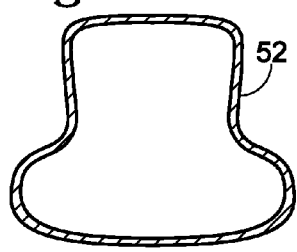
FIG. 27 is a perpendicular cross-sectional profile view of the bicycle frame of FIG. 16, taken along line 27-27 in FIG. 20.
Figure 28:
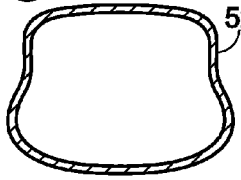
FIG. 28 is a perpendicular cross-sectional profile view of the bicycle frame of FIG. 16, taken along line 28-28 in FIG. 20.
Figure 29:
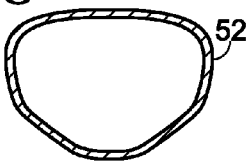
FIG. 29 is a perpendicular cross-sectional profile view of the bicycle frame of FIG. 16, taken along line 29-29 in FIG. 20.
Figure 30:
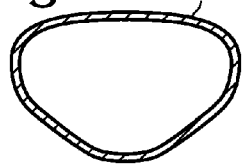
FIG. 30 is a perpendicular cross-sectional profile view of the bicycle frame of FIG. 16, taken along line 30-30 in FIG. 20.
Figure 31:
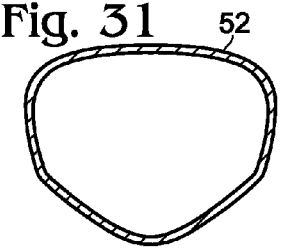
FIG. 31 is a perpendicular cross-sectional profile view of the bicycle frame of FIG. 16, taken along line 31-31 in FIG. 20.
Figure 32:
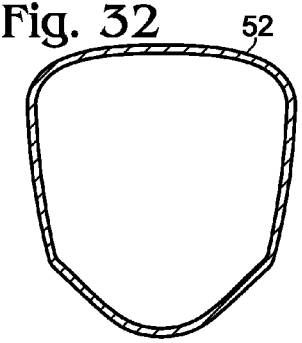
FIG. 32 is a perpendicular cross-sectional profile view of the bicycle frame of FIG. 16, taken along line 32-32 in FIG. 20.

The perpendicular cross-sectional profiles of FIGS. 27-29 correspond to the region of the frame 100 where the rear stays 56 transition into and connect to top region 52, as indicated in FIG. 20. As seen in FIGS. 27-29, the overall width of the lower portion of the perpendicular cross-sectional profiles within this region reduces, as the profiles transition forward from the rear stays. In other words, the spacing of the rear stays initially define the width of the profiles toward the rear of this region, and then the width of the profiles significantly reduces toward the front of this region.

With reference to FIGS. 29-32, which illustrate the perpendicular cross-sectional profiles of the top region, as indicated in FIG. 20, the perpendicular cross-sectional profiles forward of the rear stays may be described generally as having an upside-down tear drop shape, with a taper and narrower width toward the bottom of the perpendicular cross-sectional profiles. The perpendicular cross-sectional profiles of this region of the top region forward of the rear stays additionally or alternatively may be described as having shapes similar to typical guitar picks.

Figure 33:
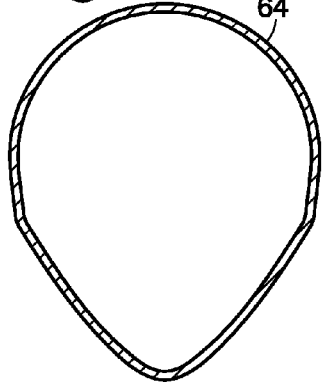
FIG. 33 is a perpendicular cross-sectional profile view of the bicycle frame of FIG. 16, taken along line 33-33 in FIG. 20.
Figure 34:
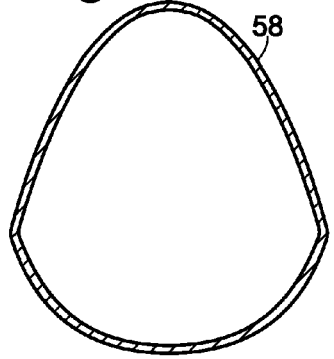
FIG. 34 is a perpendicular cross-sectional profile view of the bicycle frame of FIG. 16, taken along line 34-34 in FIG. 20.
Figure 35:
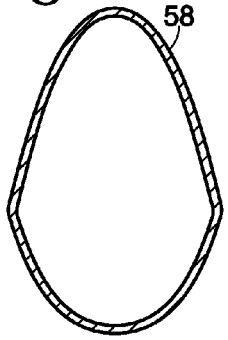
FIG. 35 is a perpendicular cross-sectional profile view of the bicycle frame of FIG. 16, taken along line 35-35 in FIG. 20.
Figure 36:
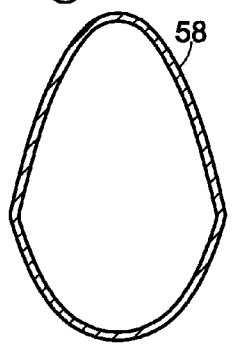
FIG. 36 is a perpendicular cross-sectional profile view of the bicycle frame of FIG. 16, taken along line 36-36 in FIG. 20.
Figure 37:
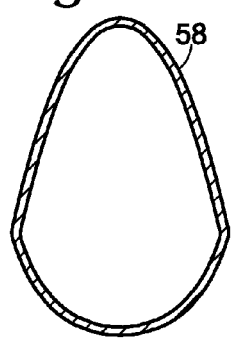
FIG. 37 is a perpendicular cross-sectional profile view of the bicycle frame of FIG. 16, taken along line 37-37 in FIG. 20.
Figure 38:
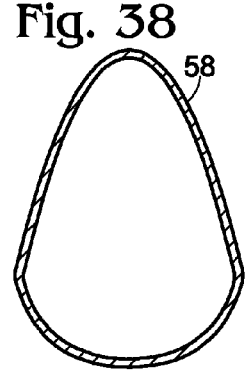
FIG. 38 is a perpendicular cross-sectional profile view of the bicycle frame of FIG. 16, taken along line 38-38 in FIG. 20.
Figure 39:
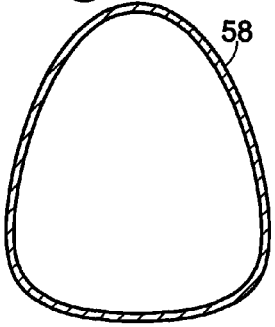
FIG. 39 is a perpendicular cross-sectional profile view of the bicycle frame of FIG. 16, taken along line 39-39 in FIG. 20.
Figure 40:
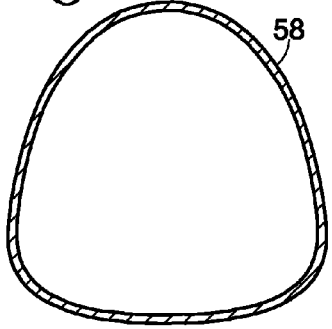
FIG. 40 is a perpendicular cross-sectional profile view of the bicycle frame of FIG. 16, taken along line 40-40 in FIG. 20.
Figure 41:
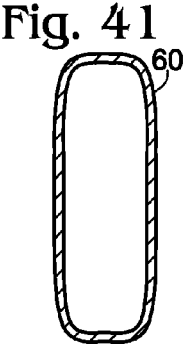
FIG. 41 is a perpendicular cross-sectional profile view of the bicycle frame of FIG. 16, taken along line 41-41 in FIG. 20.
Figure 42:
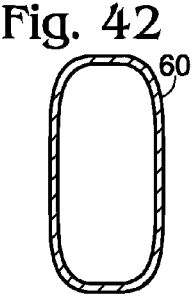
FIG. 42 is a perpendicular cross-sectional profile view of the bicycle frame of FIG. 16, taken along line 42-42 in FIG. 20.
Figure 43:
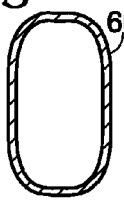
FIG. 43 is a perpendicular cross-sectional profile view of the bicycle frame of FIG. 16, taken along line 43-43 in FIG. 20.
Figure 44:
FIG. 44 is a perpendicular cross-sectional profile view of the bicycle frame of FIG. 16, taken along line 44-44 in FIG. 20.
Figure 45:
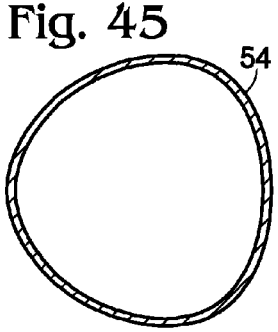
FIG. 45 is a perpendicular cross-sectional profile view of the bicycle frame of FIG. 16, taken along line 45-45 in FIG. 20.
Figure 46:
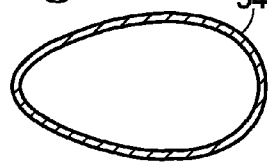
FIG. 46 is a perpendicular cross-sectional profile view of the bicycle frame of FIG. 16, taken along line 46-46 in FIG. 20.
Figure 47:
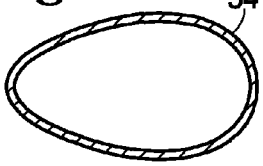
FIG. 47 is a perpendicular cross-sectional profile view of the bicycle frame of FIG. 16, taken along line 47-47 in FIG. 20.
Figure 48:
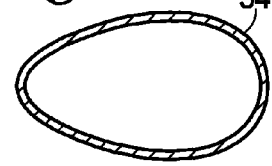
FIG. 48 is a perpendicular cross-sectional profile view of the bicycle frame of FIG. 16, taken along line 48-48 in FIG. 20.

As indicated in FIG. 20, FIG. 33 illustrates the perpendicular cross-sectional profile of the head region 64 at approximately the middle thereof, and FIG. 34 illustrates the perpendicular cross-sectional profile of the down region 58 adjacent to the head region. As indicated in FIG. 20, FIGS. 34-40 illustrate the perpendicular cross-sectional profiles of the down region. As seen in FIGS. 34-40, within the down region, the perpendicular cross-sectional profiles do not vary much in height, but the width transitions from wider, to narrower, to wider along the length of the down region from adjacent the head region to adjacent the bottom bracket. The perpendicular cross-sectional profiles of the down region may be described generally as having a tear drop shape, with a taper and narrower width toward the top of the cross-sectional profiles. The perpendicular cross-sectional profiles of the down region additionally or alternatively may be described as having shapes similar to typical guitar picks.

As indicated in FIG. 20, FIGS. 41-44 illustrate perpendicular cross-sectional profiles of the chain stays 60 of frame 100, with these profiles having a generally rounded rectangular shape and decreasing in height from adjacent the bottom bracket to adjacent the rear drop-outs.

As indicated in FIG. 20, FIGS. 45-48 illustrate perpendicular cross-sectional profiles of the seat region 54 of frame 100, with these profiles having a generally tear-drop, or guitar pick, shape, with a taper and narrower width toward the rear of the seat region. The overall width of the seat region decreases from adjacent the bottom bracket to adjacent the top region.

Figure 49:
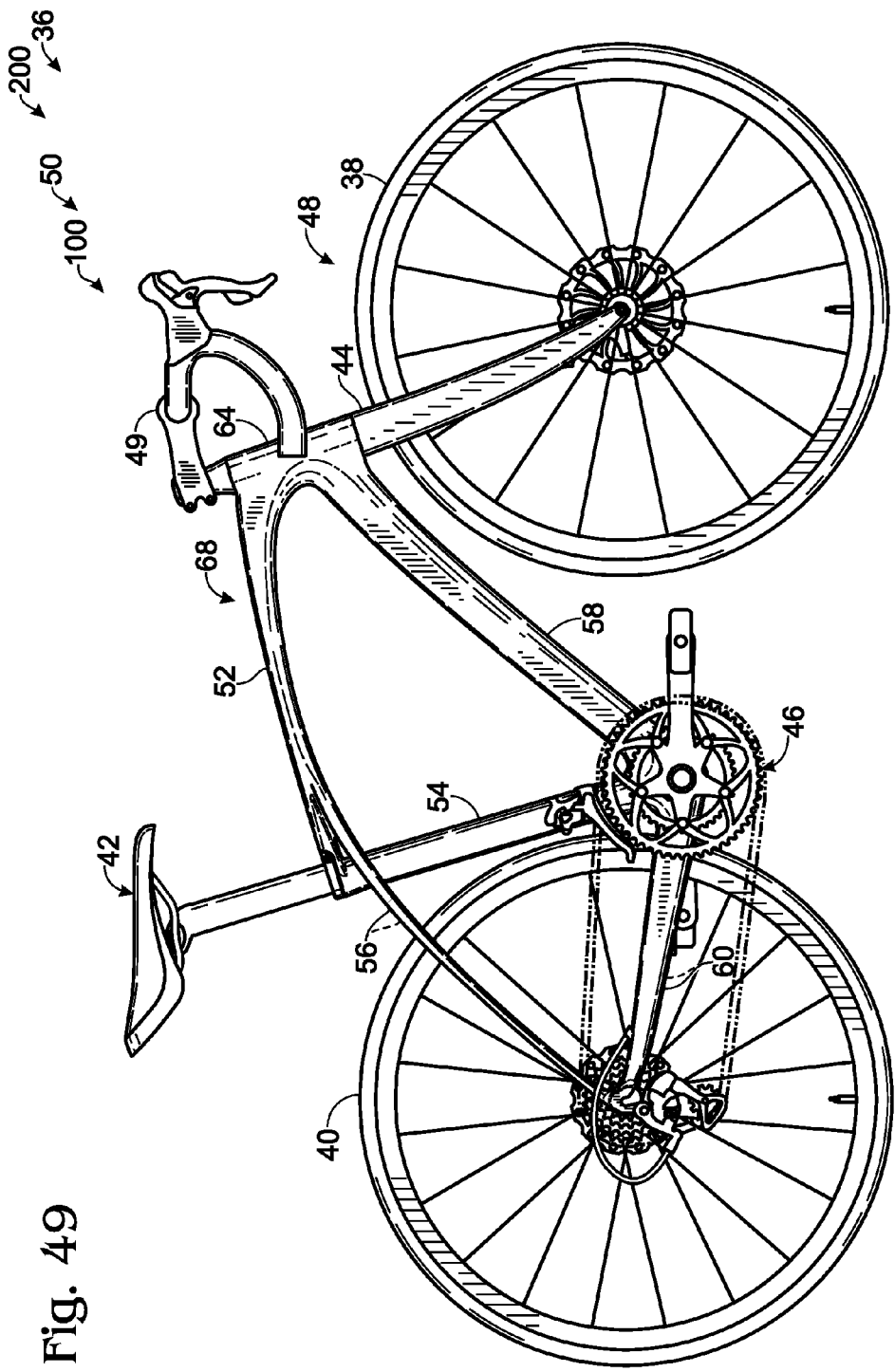
FIG. 49 is a right side view of an illustrative, non-exclusive example of a bicycle according to the present disclosure including the bicycle frame of FIG. 16.

Turning finally to FIG. 49, an illustrative, non-exclusive example of a bicycle 36 is illustrated and is indicated generally at 200. Bicycle 200 includes frame 100 of FIGS. 16-48, and also includes such optional components as a front wheel 38, a rear wheel 40, seat structure 42, a front fork 44, a drive train 46, a brake system 48, and a steering assembly 49. Of particular note is the brake system 48 of bicycle 200, which may be described as a disc brake system. An illustrative, non-exclusive example of a suitable disc brake system for use with a bicycle 36 according to the present disclosure, including bicycle 200, includes AVID® BB7 ROAD™ mechanical disc brakes and TEKTRO® rotors.

The following enumerated paragraphs represent illustrative, non-exclusive ways of describing inventions according to the present disclosure.

A A bicycle frame, comprising a top region; a seat region extending downward from the top region and configured to receive a seat post; and a pair of rear stays extending past the seat region and connected to the top region, wherein the rear stays are not connected directly and rigidly to the seat region.

A2 The bicycle frame of paragraph A, wherein the rear stays have perpendicular cross-sectional profiles that vary along a length of the rear stays.

A2.1 The bicycle frame of paragraph A2, wherein the perpendicular cross-sectional profiles of the rear stays are narrower proximal the top region than distal the top region.

A2.2 The bicycle frame of any of paragraphs A2-A2.1, wherein the perpendicular cross-sectional profiles of the rear stays are narrower adjacent the seat region than distal the top region.

A2.3 The bicycle frame of any of paragraphs A2-A2.2, wherein the perpendicular cross-sectional profiles of the rear stays have widths that decrease from distal the top region to proximal the top region.

A2.4 The bicycle frame of any of paragraphs A2-A2.3, wherein the perpendicular cross-sectional profiles of the rear stays have widths that are generally constant (or that are constant) for a substantial length of the rear stays distal the top region, and wherein the widths decrease from the substantial length to proximal the top region.

A2.4.1 The bicycle frame of paragraph A2.4, wherein the substantial length recited in paragraph A2.4 is within the range of 40-80% of an overall length of the rear stays.

A2.5 The bicycle frame of any of paragraphs A2-A2.4.1, wherein the perpendicular cross-sectional profiles of the rear stays have heights that increase from distal the top region to proximal the top region.

A2.6 The bicycle frame of any of paragraphs A2-A2.5, wherein the perpendicular cross-sectional profiles of the rear stays have heights that are generally constant (or that are constant) for a substantial length of the rear stays distal the top region, and wherein the heights increase from the substantial length toward the top region.

A2.6.1 The bicycle frame of paragraph A2.6, wherein the substantial length recited in paragraph 2.6 is within the range of 40-80% of an overall length of the rear stays.

A2.7 The bicycle frame of any of paragraphs A2-A2.6.1, wherein the perpendicular cross-sectional profiles of the rear stays have a generally rounded rectangular shape over a substantial length of the rear stays.

A2.8 The bicycle frame of any of paragraphs A2-A2.7, wherein the perpendicular cross-sectional profiles of the rear stays have a generally ovular shape over a substantial length of the rear stays.

A2.9 The bicycle frame of any of paragraphs A2-A2.8, wherein the perpendicular cross-section profiles of the rear stays have a generally elliptical shape over a substantial length of the rear stays.

A2.10 The bicycle frame of any of paragraphs A2.7-A2.9, wherein the substantial length recited in paragraph A2.7, A2.8, and/or A2.9 is in the range of 40-100% of an overall length of the rear stays.

A3 The bicycle frame of any of paragraphs A-A2.10, wherein the rear stays are connected to the top region in an asymptotic manner or at least in a generally asymptotic manner.

A4 The bicycle frame of any of paragraphs A-A3, wherein the rear stays are connected to the top region within the range of at 2-20%, 2-17%, 2-14%, 2-11%, 2-8%, 2-5%, 5-20%, 5-17%, 5-14%, 5-11%, 5-8%, 8-20%, 8-17%, 8-14%, 8-11%, 11-20%, 11-17%, 11-14%, 14-20%, 14-17%, or 17-20% of an overall length of the top region forward of the seat region.

A5 The bicycle frame of any of paragraphs A-A4, wherein the rear stays are connected to the top region at 1-45°, 1-40°, 1-35°, 1-30°, 1-25°, 1-20°, 1-15°, 1-10°, 1-5°, 5-40°, 5-35°, 5-30°, 5-25°, 5-20°, 5-15°, or 5-10° relative to a longitudinal axis of the top region.

A5.1 The bicycle frame of paragraph A5, wherein the angles enumerated in paragraph A5 correspond to a distance away from an apex defined between the rear stays and the top region in the range of 5-80, 5-55, 5-30, 30-80, 30-55, or 55-80 mm.

A5.2 The bicycle frame of any of paragraphs A5-A5.1, wherein the angles enumerated in paragraph A5 correspond to a distance away from an apex defined between the rear stays and the top region in the range of 2-20%, 2-17%, 2-14%, 2-11%, 2-8%, or 2-5% of an overall length of the rear stays away from the apex.

A6 The bicycle frame of any of paragraphs A-A5.2, wherein a substantial portion of the rear stays have a radii of curvature of at least 600 mm as viewed from a side of the frame.

A6.1 The bicycle frame of paragraph A6, wherein the substantial portion recited in paragraph A6 is within the range of 40-100%, 40-80%, 40-60%, 60-100%, 60-80%, or 80-100% of an overall length of the rear stays.

A7 The bicycle frame of any of paragraphs A-A6.1, wherein the frame is constructed predominantly of a carbon fiber composite material.

A8 The bicycle frame of any of paragraphs A-A7, wherein the rear stays are constructed predominantly of a carbon fiber composite material.

A9 The bicycle frame of any of paragraphs A-A8, wherein the top region and the seat region are not constructed predominantly of a carbon fiber composite material.

A10 The bicycle frame of any of paragraphs A1-9, wherein the frame has a vertical compliance (and/or is configured to provide for vertical movement) of 2-10 mm/1 kN, and optionally of at least 5 mm/1 kN, and optionally of at least 5.5 mm/1 kN.

A10.1 The bicycle frame of paragraph A10, wherein the frame has a vertical compliance (and/or is configured to provide for vertical movement) in the range of 5.5-6 mm/1 kN.

A11 The bicycle frame of any of paragraphs A-A10.1, wherein the frame has a vertical stiffness of 1-50% of a vertical stiffness of a comparably sized standard diamond frame having seat stays that are connected directly and rigidly to a seat tube.

A12 The bicycle frame of any of paragraphs A-A11, wherein the frame has a vertical compliance that is 1.1-2 times greater than a vertical compliance of a comparably sized standard diamond frame having seat stays that are connected directly and rigidly to a seat tube.

A13 The bicycle frame of any of paragraphs A-A12, further comprising a down region; a head region interconnecting the top region and the down region; a pair of chain stays; a bottom bracket interconnecting the seat region, the down region, and the chain stays; and a pair of rear drop-outs interconnecting the rear stays and the chain stays.

A14 The bicycle frame of any of paragraphs A-A13, wherein the rear stays do not engage the seat region.

A15 The bicycle frame of any of paragraphs A-A14, further comprising: one or more elastomeric connecting members interconnecting the rear stays and the seat region.

A16 A bicycle, comprising: the bicycle frame of any of paragraphs A-A15; a front fork; a drive train; a front wheel; and a rear wheel.

A16.1 The bicycle of paragraph A16, further comprising disc brakes.

B A bicycle frame substantially as disclosed herein.

C A bicycle frame substantially as disclosed herein and illustrated in FIGS. 16-48.

D A bicycle comprising a bicycle frame substantially as disclosed herein.

E A bicycle comprising a bicycle frame substantially as disclosed herein and illustrated in FIGS. 16-48.

E1 The bicycle of paragraph E, further comprising disc brakes.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

The disclosure set forth above encompasses multiple distinct inventions with independent utility. While each of these inventions has been disclosed in its preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods, and/or steps disclosed herein. Similarly, where any disclosure above or claim below recites "a" or "a first" element, step of a method, or the equivalent thereof, such disclosure or claim should be understood to include incorporation of one or more such elements or steps, neither requiring nor excluding two or more such elements or steps.

It is believed that the following claims particularly point out certain combinations and subcombinations that are directed to one of the disclosed inventions and are novel and non-obvious. Inventions embodied in other combinations and subcombinations of features, functions, elements, properties, methods, and/or steps may be claimed through amendment of the present claims or presentation of new claims in this or a related application. Such amended or new claims, whether they are directed to a different invention or directed to the same invention, whether different, broader, narrower, or equal in scope to the original claims, also are regarded as within the subject matter of the inventions of the present disclosure.

The invention claimed is:

1. A bicycle frame, comprising:
   a top region;
   a seat region extending downward from the top region and configured to receive a seat post;
   a pair of rear stays extending past the seat region and rigidly connected to the top region to form a unitary structure with the top region, wherein the rear stays are not connected directly and rigidly to the seat region, and wherein the rear stays have perpendicular cross-sectional profiles that vary along a length of the rear stays;
   a down region;
   a head region interconnecting the top region and the down region;
   a pair of chain stays;
   a bottom bracket interconnecting the seat region, the down region, and the chain stays;
   a pair of rear drop-outs interconnecting the rear stays and the chain stays; and
   one or more connecting members interconnecting the rear stays and lateral sides of the seat region, wherein the one or more connecting members provide for relative movement between the rear stays and the seat region.

2. The bicycle frame of claim 1, wherein the bicycle frame has a vertical compliance of 2-10 mm/1 kN.

3. The bicycle frame of claim 1, wherein the bicycle frame has a vertical stiffness of 1-50% of a vertical stiffness of a comparable frame having seat stays that are connected directly and rigidly to a seat tube but that otherwise is configured identically to the bicycle frame.

4. The bicycle frame of claim 1, wherein the bicycle frame has a vertical compliance that is 1.1-2 times greater than a vertical compliance of a comparable frame having seat stays that are connected directly and rigidly to a seat tube but that otherwise is configured identically to the bicycle frame.

5. The bicycle frame of claim 1, wherein the perpendicular cross-sectional profiles of the rear stays are narrower proximal the top region than distal the top region.

6. The bicycle frame of claim 1, wherein the perpendicular cross-sectional profiles of the rear stays are narrower adjacent to the seat region than distal the top region.

7. The bicycle frame of claim 1, wherein the perpendicular cross-sectional profiles of the rear stays have widths that decrease from distal the top region to proximal the top region.

8. The bicycle frame of claim 7, wherein the perpendicular cross-sectional profiles of the rear stays have heights that increase from distal the top region to proximal the top region.

9. The bicycle frame of claim 1, wherein the perpendicular cross-sectional profiles of the rear stays have widths that are generally constant for a substantial length of the rear stays distal the top region, and wherein the widths decrease from the substantial length to proximal the top region.

10. The bicycle frame of claim 9, wherein the substantial length is within the range of 40-80% of an overall length of the rear stays.

11. The bicycle frame of claim 1, wherein the perpendicular cross-sectional profiles of the rear stays have heights that increase from distal the top region to proximal the top region.

12. The bicycle frame of claim 1, wherein the perpendicular cross-sectional profiles of the rear stays have heights that are generally constant for a substantial length of the rear stays distal the top region, and wherein the heights increase from the substantial length toward the top region.

13. The bicycle frame of claim 12, wherein the substantial length is within the range of 40-80% of an overall length of the rear stays.

14. The bicycle frame of claim 1, wherein when viewed from a lateral side of the bicycle frame, the rear stays are connected to the top region in a generally asymptotic manner.

15. The bicycle frame of claim 1, wherein the rear stays are connected to the top region at 2-20% of an overall length of the top region forward of the seat region.

16. The bicycle frame of claim 1, wherein the rear stays are connected to the top region at 1-30° relative to a longitudinal axis of the top region.

17. The bicycle frame of claim 16, wherein the 1-30° corresponds to a distance away from an apex defined between the rear stays and the top region in the range of 5-80 mm.

18. The bicycle frame of claim 16, wherein the 1-30° corresponds to a distance away from an apex defined between the rear stays and the top region in the range of 2-20% of an overall length of the rear stays.

19. The bicycle frame of claim 1, wherein a substantial portion of the rear stays have a radii of curvature of at least 600 mm as viewed from a side of the frame.

20. The bicycle frame of claim 19, wherein the substantial portion is within the range of 40-100% of an overall length of the rear stays.

21. The bicycle frame of claim 1, wherein the bicycle frame is constructed predominantly of a carbon fiber composite material.

22. The bicycle frame of claim 1, wherein the rear stays are constructed predominantly of a carbon fiber composite material.

23. The bicycle frame of claim 22, wherein the top region and the seat region are not constructed predominantly of a carbon fiber composite material.

24. The bicycle frame of claim 1, wherein the rear stays do not engage the seat region.

25. The bicycle frame of claim 1, wherein the one or more connecting members include one or more elastomeric connecting members.

26. The bicycle frame of claim 1, wherein when the seat region is under a vertical load, an upper portion of the seat region bends rearward relative to the rear stays.

27. The bicycle frame of claim 26, wherein when the seat region is under the vertical load, the bottom bracket does not substantially move vertically.

28. The bicycle frame of claim 1, wherein when the seat region is under a vertical load, an upper portion of the seat region bends rearward relative to the rear stays.

29. The bicycle frame of claim 28, wherein when the seat region is under the vertical load, the bottom bracket does not substantially move vertically.

30. A bicycle frame, comprising:
a top region;
a seat region extending downward from the top region and configured to receive a seat post;
a pair of rear stays extending past the seat region and connected to the top region, wherein the rear stays are not connected directly to and do not engage the seat region, wherein the rear stays have perpendicular cross-sectional profiles that vary along a length of the rear stays, wherein the perpendicular cross-sectional profiles of the rear stays have widths and heights that are generally constant for a substantial length of the rear stays distal the top region, wherein the widths decrease and the heights increase from the substantial length to proximal the top region, wherein the substantial length is within the range of 40-80% of an overall length of the rear stays;
a down region;
a head region interconnecting the top region and the down region;
a pair of chain stays;
a bottom bracket interconnecting the seat region, the down region, and the chain stays;
a pair of rear drop-outs interconnecting the rear stays and the chain stays; and
one or more connecting members interconnecting the rear stays and lateral sides of the seat region, wherein the one or more connecting members provide for relative movement between the rear stays and the seat region.

31. The bicycle frame of claim 30, wherein the rear stays have a perpendicular cross-sectional profile proximal to the top region, in which the height is greater than the width.

32. The bicycle frame of claim 30, wherein the rear stays are not pivotally connected to the top region.

33. The bicycle frame of claim 30, wherein the rear stays are rigidly connected to the top region.

34. The bicycle frame of claim 30, wherein the rear stays transition into the top region to form a unitary structure.

35. The bicycle frame of claim 30, wherein the rear stays transition into the top region in an asymptotic manner, when viewed from a lateral side of the bicycle frame, to form a unitary structure.

36. A bicycle frame, comprising:
a top region;
a seat region extending downward from the top region and configured to receive a seat post;
a pair of rear stays extending past the seat region and rigidly connected to the top region to form a unitary structure with the top region, wherein the rear stays are not rigidly connected to the seat region;
a down region;

a head region interconnecting the top region and the down region;
a pair of chain stays;
a bottom bracket interconnecting the seat region, the down region, and the chain stays;
a pair of rear drop-outs interconnecting the rear stays and the chain stays;
means for having a vertical compliance of the frame of 2-10 mm/1 kN; and
one or more connecting members interconnecting the rear stays and lateral sides of the seat region, wherein the one or more connecting members provide for relative movement between the rear stays and the seat region.

* * * * *